United States Patent [19]

Bhushan

[11] 4,227,756
[45] Oct. 14, 1980

[54] HIGH TEMPERATURE LOW FRICTION SURFACE COATING

[75] Inventor: Bharat Bhushan, Watervliet, N.Y.

[73] Assignee: Mechanical Technology Incorporated, Latham, N.Y.

[21] Appl. No.: 974,264

[22] Filed: Dec. 29, 1978

[51] Int. Cl.² .......................... F16C 17/00; F16C 33/00
[52] U.S. Cl. .............................. 308/241; 308/DIG. 1
[58] Field of Search ................... 308/DIG. 1, DIG. 8, 308/DIG. 9, DIG. 15, 237 R, 241; 427/372 B; 428/471

[56] References Cited

U.S. PATENT DOCUMENTS 3,308,524  3/1967  Moyer ........................... 308/DIG. 8

FOREIGN PATENT DOCUMENTS 2356616  11/1972  Fed. Rep. of Germany .... 308/DIG. 8

Primary Examiner—Charles E. Phillips
Attorney, Agent, or Firm—Joseph V. Claeys; John M. Neary

[57] ABSTRACT

A high temperature, low friction, flexible coating for metal surfaces which are subject to rubbing contact includes a mixture of three parts graphite and one part cadmium oxide, ball milled in water for four hours, then mixed with thirty percent by weight of sodium silicate in water solution and a few drops of wetting agent. The mixture is sprayed 12–15 microns thick onto an electro-etched metal surface and air dried for thirty minutes, then baked for two hours at 65° C. to remove the water and wetting agent, and baked for an additional eight hours at about 150° C. to produce the optimum bond with the metal surface. The coating is afterwards burnished to a thickness of about 7–10 microns.

4 Claims, 1 Drawing Figure

U.S. Patent   Oct. 14, 1980   4,227,756
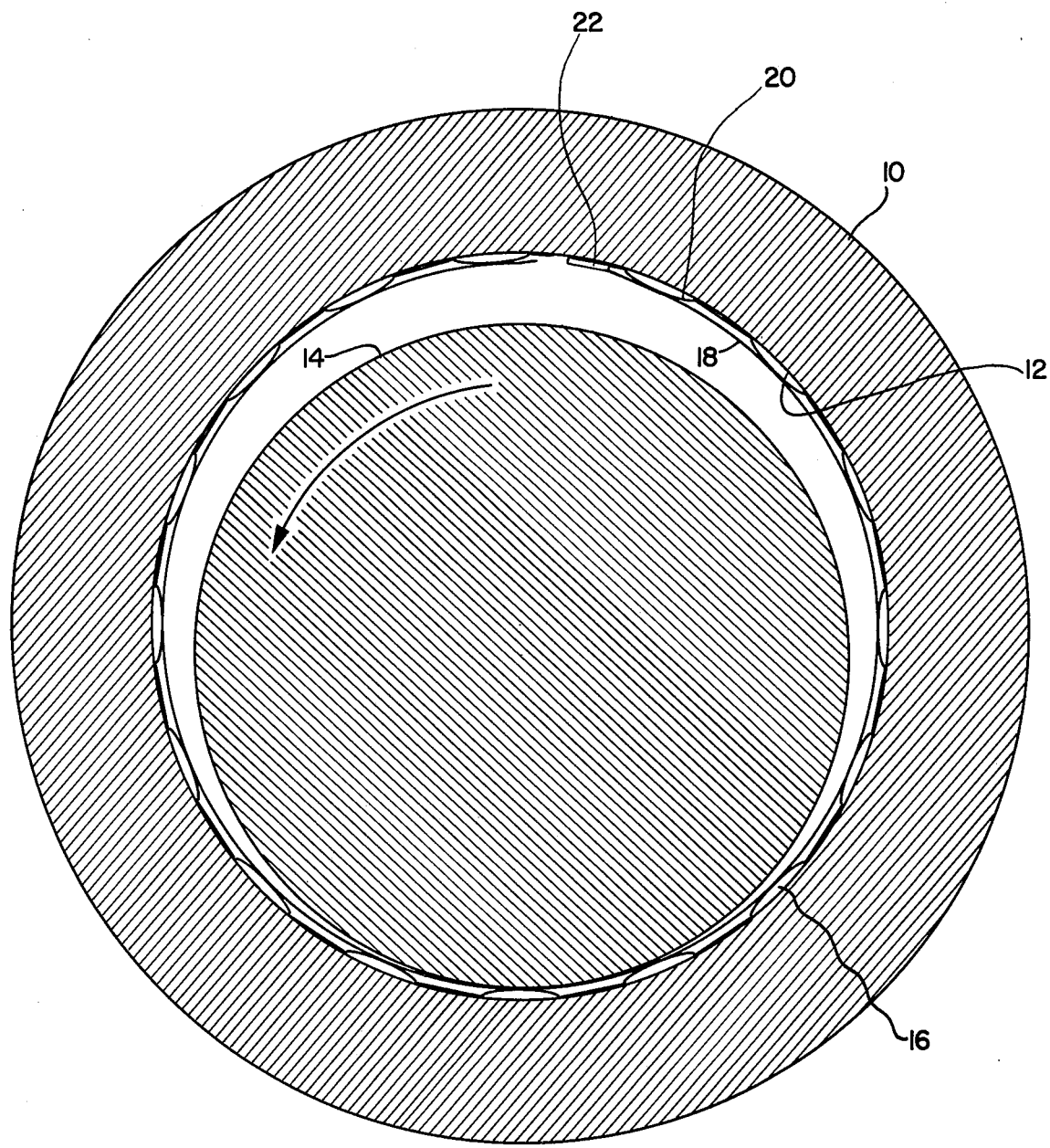

HIGH TEMPERATURE LOW FRICTION SURFACE COATING

The Government has rights to this invention pursuant to Contract No. NAS-3-19427 awarded by the U.S. Department of Energy.

BACKGROUND OF THE INVENTION

Recent and developing applications for compliant hydrodynamic gas bearings require operation at high rotational speeds, extremely high temperatures, under heavy loads and in the absence of oil lubrication. The gas turbine is a prime example of this application. Uses of the gas turbine are expanding rapidly and include prime mover and auxiliary power systems for aviation, marine and automobile applications. The compliant hydrodynamic gas bearing offers potentially higher operating temperatures, elimination of oil lubrication requirements and limitations, greater accomodation of thermal distortion, assembly variations, tolerance of dynamic shaft motion because of bearing compliance, reduced frictional power loss, reduced rotor noise and lower bearing costs. Accordingly, this bearing is ideal for gas turbine applications.

One troublesome problem that has delayed full implementation of the compliant hydrodynamic gas bearing has been damage to the bearing surface during start and stop phases of operation. The supporting gas film generated in a hydrodynamic bearing due to relative rotation of the bearing surfaces is not sufficient to support the rotor until it reaches a certain speed. At that time, the gas film lifts the rotor from the bearing surface and thereafter the gas lubrication prevents further contact between bearing surfaces. Although the relative rotation during the contact phase is quite slow, the cumulative effect of the contact can be sufficient to gall the bearing surfaces. In addition, shocks or violent eccentric loading of the rotor can cause momentary contact of the bearing surfaces which also can result in galling of the bearing surfaces. The galling can weaken the flexible bearing sheet and can actually interfere with the operation of the bearing during the hydrodynamic phase of the operation.

One solution which has been attempted in the past is to provide a low friction coating on the bearing surfaces. Low friction coatings appear to be promising, but are not usually adaptable to application in compliant bearings because of the particular requirements. In general, the known prior art coatings have been developed for rigid members, whereas, in compliant bearings, the coating is applied to a flexible bearing sheet which is continually flexed during operation. As a consequence, the coating itself must be flexible or it will crack and possibly break up during operation. If this happens, the bearing surface can become damaged very quickly and, even worse, the abrasive wear products of the crumbling coating can themselves greatly shorten the life of the bearing. To achieve flexibility, the coating must be applied in a very thin layer, but a very thin layer will wear through rapidly if it is not extremely tough. In addition, the coating material must bond permanently to the substrate and be unaffected by flexing, temperature changes and harsh environment agents. Finally, the coating must perform well at ambient or start-up temperature, at the normal operating temperature of the machine on which it is installed, such as a gas turbine, and at all intervening temperatures. For example, when the engine is started, it can be quite cold. When it is stopped, the temperature of the bearing is normally at the operating temperature of the engine which can be in the neighborhood of 430° C. Coatings which function well at lower temperatures are often found to deteriorate at higher temperatures. Some high temperature coatings which function well at elevated temperatures do not provide good anti-friction characteristics at lower temperatures.

SUMMARY OF THE INVENTION

It is thus an object of my invention to provide a low friction coating for metal surfaces of a flexible substrate operable over a wide temperature range. The coating must be extremely durable to provide long life in hostile environments such as high temperature and in the presence of gas lubricants, such as air, hydrogen, argon and helium. In addition, a method must be available for applying the coating to a thin flexible metal substrate. The method must be extremely reliable since faults in the coating would be difficult to detect and could result in premature failure of high cost, sophisticated equipment. The method and the materials used in producing the coating should be inexpensive and readily available. Finally, they should not produce wear products that would interfere with the operation of the bearing or other areas of the machine or otherwise be incompatible with the operation of the machine.

One embodiment of the invention which meets all of the above objects and others is made by mixing cadmium oxide and graphite powders in proportions of about 1 to 3 and agitating the mixture in water. Approximately 28–32% by weight of sodium silicate in water solution and one drop of wetting agent in proportions of one drop to 250 cc of solution are added and stirred vigorously then sprayed onto a carefully pretreated substrate, in a coating about 12–15 microns thick. The coating is baked in an oven at 65° C. for two hours, and afterwards is baked at 150° C. for eight hours. The baked coating is then burnished to about 7–10 microns thickness. This provides a flexible coating for a flexible substrate which is chemically stable at elevated temperatures, is dimensionally stable and compatible thermally and chemically with the flexible substrate. The coating is resistant to thermal and mechanical shocks and provides protection for the substrate against corrosion. It is highly conductive thermally to rapidly dissipate frictional heat from the bearing interface, and is easily and reliably applied to the substrate with a secure bond in a coating that is uniform and free of faults. It is a low friction and durable coating that provides good antigalling and self-healing characteristics in the event that the coating is penetrated, and it is available at acceptable cost.

DESCRIPTION OF THE DRAWINGS

The invention and its foregoing objects and advantages will be better understood by reference to the following detailed description of the preferred embodiment when read in conjunction with the following drawings which is a perspective view of a compliant fluid hydrodynamic bearing having a flexible bearing sheet on which the coating of this invention is applied.

DESCRIPTION OF THE PREFERRED EMBODIMENT

Referring now to the drawing, a compliant hydrodynamic fluid journal bearing is shown having a bearing sleeve 10 with a cylindrical bore 12 in which is disposed a rotatable shaft 14 supported by a bearing assembly 16. The shaft diameter is actually nearly equal to the inner diameter of the bearing assembly 16, but is illustrated much smaller for clarity of illustration. The bearing assembly 16 includes a flexible bearing sheet 18 supported by a resilient supporting element 20. The bearing sheet 18 is welded as by spot welding to the top of a spacer block 22 and the end of the resilient supporting element 20 is welded to the bottom of the spacer block 22. The spacer block end of the assembly is fixed in the bearing sleeve 10 against rotation. The shaft 14 rotates in the direction indicated by the arrow and generates a hydrodynamic gas wedge between the surface of the shaft 14 and the bearing surface of the sheet 18 to support the shaft 14 on a film of gas. Advanced bearings of this nature are disclosed in application Ser. No. 974,256 of Gray and Heshmat, application Ser. No. 974,262 of Miller and application Ser. No. 974,263 of Gray and Bhushan copending herewith.

During the start up and stop phases of operation, the shaft 14 is moving too slowly with respect to the bearing sheet 18 to generate sufficient pressure in the hydrodynamic supporting gas film to lift the shaft 14 off the bearing sheet 18, and therefore, there is physical contact between the surface of the shaft and the bearing surface of the flexible sheet 18. During these phases of operation, it is necessary that the bearing surfaces be protected from excessive wear and other mechanical damage which would adversely affect the operation of the machine or damage the bearing or the shaft 14. The protection is afforded by an antifriction coating on the shaft 14 and/or the flexible bearing sheet 18.

I prefer to coat the bearing sheet 18 with the softer antifriction coating. Then, if it wears off after a long period of use, the bearing sheet 18 or the entire stationary bearing assembly can be replaced much more easily than replacing the rotor. In addition, using the method of this invention, the coating is more easily applied to the bearing sheet 18 than to the rotor surface.

The conventional approach to antifriction coatings is to choose one or a combination of two alternative possibilities: hard wear resistant coatings and soft, low shear-strength coatings. The first approach is to utilize certain naturally occurring oxide films that can provide protection for metallic surfaces sliding in contact. The other approach is to use certain coating materials that are believed to have a layered lattice, hexagonal crystal structure which tends to wear smoothly with little tendency for surface damage. Also, many combinations of materials can interact to form eutectic compounds which behave as low shear strength solid films. In most cases, such desirable interactions are limited to high temperature or high energy input conditions.

Coating techniques may also affect coating effectiveness; i.e., bond strength, wear resistance and life. Coating techniques include hard facing such as thermospray, plasma-spray, detonation gun, welding and brazing. Another technique is the diffusion process exemplified by nitriding, boriding and carbonizing. Chemical vapor deposition and physical vapor deposition techniques are also available, including evaporation, sputtering and ion plating. In addition, there are fusion and electroplating and other proprietary processes which are primarily combinations of the aforementioned techniques. Therefore, a great many materials and a great many techniques of applying the materials are available for investigation.

Finally, the addition of binders to the wear resistant material may improve the bond and the thermal and mechanical shock resistance of the coating. Binders may also improve the self-healing characteristics of the coating so that mechanical damage to the surface of the coating can be corrected by the action of the bearing itself to protect the substrate from oxidation and prevent the delamination of the coating from the point of mechanical damage.

The emphasis in the prior art has been to provide soft lubricant films in relatively low temperature applications; i.e., 315° C. to 370° C. At temperatures above this, it has previously been necessary to use the hard-to-hard combination of materials because the known softer materials could not stand the high temperature. The hard-to-hard combinations are not as desirable as combinations including softer materials because of the poorer lubricity of the hard materials. In investigating the subject, the great number of available materials and coating techniques must be investigated in enormous numbers of combinations. The number of combinations is even further increased by the fact that it is of significance which bearing surface is to be coated with which material. For example, a particular area on the surface of the shaft 14 "sees" the area of the contact only once per revolution; however, the area on the flexible bearing sheet 18 which is in contact with the shaft during the contact phase of operation is in constant contact with it and therefore "sees" the contacting surface of the shaft 14 continuously. Thus, the conditions which the bearing surfaces are subjected to are considerably different. The underlying cause of this difference is thermal in nature. When the journal is in rubbing contact with the bearing sheet, the contact area on the sheet is fixed and all of the frictional heat is concentrated in one area, while the contact on the journal is continuously changing with the shaft rotation and the temperature rise of the journal surface is much more gradual. These conditions affect the choice of materials for the two surfaces.

The bearing sheet material is INCONEL X-750, a high temperature alloy made by Huntington Alloys of Huntington, W. Va. It is preferred because of its ease of heat treatment, good spring properties, availability in thin foil sections, moderate cost, and because it can tolerate the high temperature and retain its good physical properties. It is a nickel-based alloy containing nickel, chromium, iron and titanium primarily. The shaft material is A-286 stainless steel which is commonly used in high temperature gas turbine applications. This material has the necessary thermal and mechanical properties at 1200° F. and provides a satisfactory trade off between machinability, availability, cost and high temperature strength. It is an iron-based alloy containing the elements of iron, nickel, chromium, titanium and manganese, primarily.

After much investigation, I have found that a mixture of cadmium oxide and graphite, known to be a good lubricant in powder form, can be applied to a flexible substrate in a ceramic matrix as a flexible coating that can withstand constant temperatures of 430° C. and brief excursions to 540° C. without thermal damage. It provides a durable, long lasting, low friction protection for the flexible bearing sheet in a compliant bearing.

The process of applying this coating to the Inconel X-750 surface is most effective if preceeded by careful preparation of the flexible bearing sheet. The bearing sheet is heat treated to give it the desired properties of hardness and resilience, but the heat treatment results in a thin, slippery oxide layer on the surface to which bonding of the coating is difficult to achieve. Therefore, this oxide layer should be stripped off and the surface should be roughened in order to achieve a secure bond for the coating. The valleys on the surface after roughening provide anchoring points, and particles of the coating material are interlocked in these valleys, so the roughening procedure militates significantly for the bond strength of the coating. This has been confirmed by metallurgical examination. A coating surface which was burnished to remove all the coating was examined under a scanning electron microscope, revealing that the coating material particles were trapped in the grain boundaries of the substrate as desired.

Numerous processes of pretreating the surface to be coated are available. These include phosphating, sandblasting, vapor honing, hand polishing, acid etching and electrolytic etching.

I considered the mechanical treatments to be unacceptable because of the distortion they produce in the thin bearing sheets which range in thickness between 50 and 200 microns, with most between 100 and 150 microns. It is important in the operation of compliant hydrodynamic bearings that the bearing sheet lie flat; curling and wrinkling of the bearing sheet produced by these mechanical treatments make it difficult or impossible to ensure the necessary flatness.

Acid etching attacks the surface nonuniformly causing the oxide layer to come off in some spots earlier than others and for the surface to be pitted. I believe this lessens the mechanical strength and the fatigue life of the bearing sheet which can be subjected in use to extremely high stresses.

A cleaning and roughening technique, which I found to work well, was electroetching. The etching solution consists of 25 grams of sodium floride and 95 cc sulfuric acid in 1 liter of water. The INCONEL X-750 bearing sheet is wired to a 6 volt power supply and inserted as the anode in the etching solution (any other material can serve as the cathode) and the sheet is etched at 2325 amp per square meter for 2 minutes. This removes the oxide layer completely and attacks the grain boundaries somewhat primarily removing small amounts of chromium and gamma prime phase. The grain surface is not attacked, so the resulting profile is a mosaic of grains, perhaps 20 microns in diameter, surrounded by etched lines about 0.28 microns deep at the grain boundaries. The concentration of chromium on the etched surface is fairly uniform, indicating that the loss of chromium at the grain boundaries does not significantly affect the composition of the material. Whatever loss of chromium and chromium carbides that may occur at the grain boundaries is not sufficient to affect the oxidation resistance of the material. Concentrations of nickel and titanium are fairly uniform. I believe that the loss of a gamma prime phase, the intermetallic compound $Ni_3$ (Al, Ti), which is formed in the grain interiors and adjacent to the grain boundaries and is responsible for the increase in tensile and fatigue strength which occurs during age hardening, is restricted to the boundaries and is so small that its effect on the tensile and fatigue strength of the material is insignificant. My tests have confirmed that the etching produces hardly any change in the strength of the bearing sheet. Indeed, I found that the fatigue strength of the bearing sheet etched on one surface is actually slightly higher than that of an unetched sheet. I believe this affect occurs because the etching removes mechanical defects, such as micro-crevices and micronotches from the surface, thus improving the fatigue strength. However, I found that the tensile and fatigue strength of the material etched on both sides is slightly lower than the material etched on only one side. Thus, it is advisable to mask one side of the bearing sheet and etch only the side that is to be coated with the coating material. The masking can be done with stop-off lacquer such as no. 323 red supplied by M & T Chemicals, Inc., N.J. The average or rms roughness of the etched foil is about 0.28 microns. A range of 0.23-0.33 microns rms is about optimum for this material.

The etched material is then thoroughly washed in water in an ultrasonic cleaner to mechanically clean particulate material from the surface and etched grain boundaries, and afterwards is cleaned with alcohol to remove all chemicals from the surfaces.

The coating composition is prepared by mixing one part cadmium oxide powder with three parts graphite powder in a quantity of distilled water. The mixture is agitated, as in a ball mill, until the particles of cadimum oxide and graphite are finely and uniformly dispersed throughout the water. I find that four hours in the ball mill is sufficient time to achieve the desired dispersement, although it may be accomplished in lesser time with other techniques.

After agitation, the mixture is removed immediately from the ball mill and poured into the container of an air brush. This and the next steps must be accomplished with dispatch to prevent the cadmium oxide particles from settling out of the mixture. A drop of wetting agent in proportions of one drop to about 250 cc of solution is added and the mixture is stirred and heated to about 65° C. The wetting agent is Absol 895 which is a liquid, nonionic surfactant supplied by Surpass Chemical Company, Inc., Albany, N.Y. The mixture is heated to 65° C. because that is the most effective temperature for the action of the wetting agent. After stirring, 28%-32% by weight of solid sodium silicate, dissolved in water, is added to the solution and it is stirred vigorously. Less sodium silicate does not give a good bond, and more sodium silicate produces a coating of insufficient lubricity. I find that 30% is about the best proportion. The viscosity of the mixture at this point is adjusted by adding distilled water so that the mixture is liquid enough to spray through the air brush, but it is not so fluid that it will run off the substrate when sprayed.

The mixture is now sprayed onto the clean and roughened surface of the substrate to a thickness of about 12-15 microns. To prevent the fluid coating from being disturbed, I allow it to air dry for about 30 minutes at which time the coating is firm enough to be handled without being disturbed. The bearing sheet is baked in an oven at about 65° C. for two hours or as long as necessary to remove the water and wetting agent. Then it is baked at about 150° C. until the sodium silicate is fused. I have found that a baking time of about eight hours is sufficient to fuse the sodium silicate, although a shorter time at a higher temperature might achieve the same result. The bond of the coating to the substrate is extremely good. I believe the explanation for this excellent bond is that the cadmium oxide reacts with the sodium silicate to produce cadmium silicate and possibly other compounds at the bond interface which improves the bond.

The resulting coating is fairly irregular, so it should be burnished with fine emery paper to 7–10 microns thickness. This gives a smoothness of less than 0.15 microns rms and a coating thickness that is thin enough to be flexible, but thick enough to resist rapid wear. A coating thicker than 12 microns does not adhere well.

The coating produced by this method is sufficiently flexible to use on a flexible bearing sheet of a compliant hydrodynamic gas bearing and maintain a smooth, continuous surface without developing cracks or other breaks in the surface. The coating is tenaciously adherent and very durable. It offers superior lubricity at low cost over a temperature range of below freezing to 430° C., with brief excursions to 540° C. producing no damage. The method of applying the coating is simple and reliable, repeatably producing a coating without defects which meets all specifications.

Obviously, numerous modifications and variations of the disclosed method and coating are possible in view of the teachings herein. These modifications and variations, and the equivalents thereof, are expressly to be understood to fall within the spirit and scope of my invention which is defined in the following claims, wherein I claim:

1. In a compliant hydrodynamic gas bearing for high temperature applications, a flexible bearing sheet with one bearing surface, and a relatively rotating rigid member with an opposing bearing surface, the improvement comprising:
   a flexible coating of less than 12 microns thickness on the bearing surface of the flexible bearing sheet, including a layer of CdO and graphite in proportions of about 1:3 by weight, dispersed in a fused matrix of 28%–32% by weight sodium silicate.

2. The bearing defined in claim 1, wherein said bearing sheet is a high temperature, nickel-based material, also containing chromium, iron and titanium, between 50 and 200 microns thick, which has been heat treated for hardness, resilience and strength, and has been electroetched on said bearing surface to remove the oxide film resulting from said heat treatment and to roughen said surface, primarily at the grain boundaries, to improve the bond of said coating on said surface.

3. The bearing defined in claim 2, wherein the surface roughness of said bearing sheet under said coating is approximately 0.23–0.33 microns rms.

4. In a hydrodynamic gas bearing, for high temperature applications, including a stationary member and a relatively rotating member, each member having a bearing surface facing the bearing surface of the other member, the improvement comprising:
   a hard oxide or carbide coating on the bearing surface of said rotating member; and
   a solid coating bonded to the bearing surface of said stationary member, including a dispersion of CdO and graphite powders, in proportions of about 1:3 by weight, in a fused matrix of about 28%–32% by weight of sodium silicate.

* * * * *